US00RE38384E

(19) United States
(12) Reissued Patent
Wong

(10) Patent Number: US RE38,384 E
(45) Date of Reissued Patent: Jan. 13, 2004

(54) TERMINAL FOR AN ELECTRICAL CONNECTOR

(76) Inventor: Yin Hong Wong, 158 Jala Dato Sulaiman, Century Garden, Post Code 80250, Johor Bahru (MY)

(21) Appl. No.: 10/270,610

(22) Filed: Oct. 16, 2002

Related U.S. Patent Documents

Reissue of:
(64) Patent No.: 6,368,166
Issued: Apr. 9, 2002
Appl. No.: 09/756,678
Filed: Jan. 10, 2001

(30) Foreign Application Priority Data

Jan. 10, 2000 (GB) ..... 0000338
Jun. 27, 2000 (GB) ..... 0015706

(51) Int. Cl.[7] ..... H01R 4/36
(52) U.S. Cl. ..... 439/811
(58) Field of Search ..... 439/810, 811, 439/812

(56) References Cited

U.S. PATENT DOCUMENTS 1,958,196 A * 5/1934 Lundy et al. ..... 439/811
2,076,209 A * 4/1937 Rowe ..... 439/810
2,222,156 A * 11/1940 Rowe ..... 439/812
4,103,986 A * 8/1978 Izraeli ..... 439/811
4,213,669 A * 7/1980 Wittes et al. ..... 439/811
4,505,534 A * 3/1985 Shannon ..... 439/810
5,129,844 A * 7/1992 Goto et al. ..... 439/778
5,690,515 A * 11/1997 Cipolla ..... 439/797
5,934,818 A * 8/1999 Schmitt et al. ..... 439/812
6,186,839 B1 * 2/2001 Storey et al. ..... 439/812

FOREIGN PATENT DOCUMENTS

GB 875693 * 8/1961

* cited by examiner

*Primary Examiner*—Hae Moon Hyeon
(74) *Attorney, Agent, or Firm*—Pillsbury Winthrop LLP

(57) ABSTRACT

A terminal for an electrical connector comprises a pin having a channel for receiving an electrical conductor cable. A screw threaded into the pin secures the electrical cable in the channel by applying pressure to the cable by rotation of the screw. A pressure transfer element is positioned between the screw and the channel for applying pressure from the screw to the cable in the channel to secure the cable in the opening. The pressure transfer element is mounted in such a manner as to allow movement of the element towards the cable but to prevent rotary movement of the element relative to the said channel to prevent distortion of the cable.

14 Claims, 3 Drawing Sheets

TERMINAL FOR AN ELECTRICAL CONNECTOR

Matter enclosed in heavy brackets [ ] appears in the original patent but forms no part of this reissue specification; matter printed in italics indicates the additions made by reissue.

The present invention relates to a terminal for an electrical connector, in particular, but not exclusively, a terminal formed on a pin of an electric plug.

In a conventional electric plug there are three pins, and electrical connecting wires or cables composed of a plurality of strands are connected thereto. In each of the earth, neutral, and live pins, the multi-strand cable is inserted into a circular cross-section channel of a terminal on top of the pin, and a screw threaded into the terminal is used to apply pressure on the cable by tightening the screw. Thus the screw presses the cable hard against the inner wall of the channel to provide connection between the pin terminal and the electric wire, so that the cable receives current from the power supply, through the pin. However a problem arises in that as the screw is tightened by rotating the screw by a screw driver, the tip of the screw first comes into contact with the bare cable, and a downward force and also a rotary force are applied to the cable. Since the cable is composed of a group of strands, some of the wire strands are caused to be deformed. It is an object of the present invention to overcome, or at least reduce, this problem.

According to the present invention there is provided a terminal for an electrical connector, the terminal comprising: a terminal body, an opening in the terminal body for receiving an electrical conductor, a screw threaded into the terminal body for securing the electrical conductor in the opening by applying pressure to the conductor by rotation of the screw, and a pressure transfer element positioned between the screw and the opening for applying pressure from the screw to a conductor in the opening to secure the conductor in the opening.

In one preferred form, one end of the terminal body has a cavity leading to the said opening for the electrical conductor, the transfer element being positioned in the cavity and being movable in the cavity towards the said opening to secure the electrical conductor in the opening, the walls of the cavity having screw threads to allow the screw to be threaded into the terminal body and to protrude into the cavity to make contact with the pressure transfer element. Conveniently the opening is a channel extending into or through the terminal body in one direction and the cavity is an open trough-shaped cavity on top of the terminal body extending transverse to direction of the channel. In one preferred form embodying the invention the pressure transfer element has one side for contacting a conductor in the said opening in the terminal body, and an opposite side for contacting the screw, the first side having a protruding portion for contacting the conductor in the opening, and the opposite side having a U-shaped valley therein into which the screw protrudes.

In one particularly preferred form the opening comprises a channel of circular cross-section, and the pressure transfer element has a convex curved surface on its side remote from the screw, positioned opposite an interior surface of the channel, for securing a conductor in the channel by gripping the conductor between the curved surface of the pressure transfer element and the interior surface of the channel. Preferably the convex curved surface has a part circular cross-section of radius less than the radius of the cross-section of the channel.

It is a preferred feature that the pressure transfer element is mounted in such a manner as to allow movement of the element towards the said opening for the conductor, but to prevent rotary movement of the transfer element relative to the said opening. Another preferred feature is that the contact area of the pressure transfer element available in use for contacting an electrical conductor in the opening, is greater than the contact area of the screw with the pressure transfer element. These preferred features allow the conductor to be secured in place while preventing, or reducing, the tendency for a rotation of the screw to deform the conductor which is being secured.

An embodiment of the invention will now be described by way of example with reference to the accompanying drawings in which.

Figure 2:
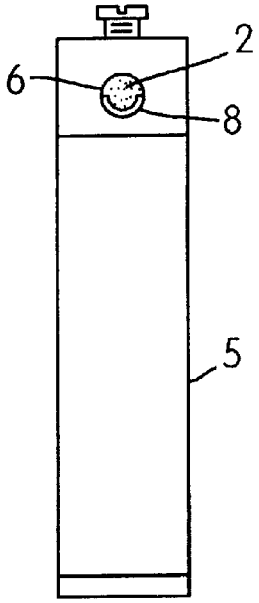
FIGS. 2 and 3 show respectively a front view and plan view of the pin of FIG. 1.
Figure 1:
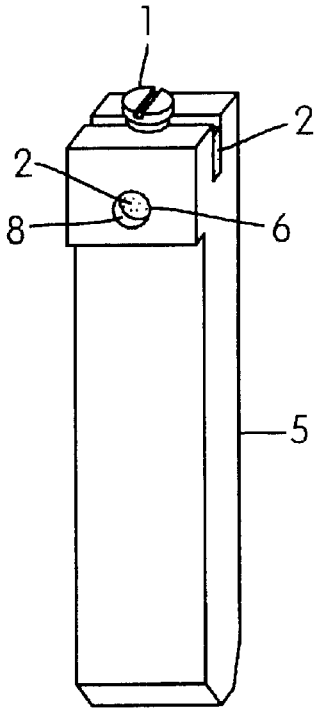
FIG. 1 is a perspective view of the neutral pin of an electric plug.

Referring first to FIG. 1, a terminal for an electrical connector embodying the invention is constituted by a pin 5 of an electric plug. The pin 5 forms at its upper end a terminal body having a circular cross section channel or bore 6 for receiving an electrical conductor such as a cable 3 shown in FIG. 4. A screw 1 is threaded into the top of the pin 5 to secure the cable in the channel 6 by applying pressure to the cable by rotation of the screw. Between the screw 1 and the channel 6 there is provided a pressure transfer element 2 for applying pressure from the screw to the cable to secure the cable in the channel.

Figure 7:
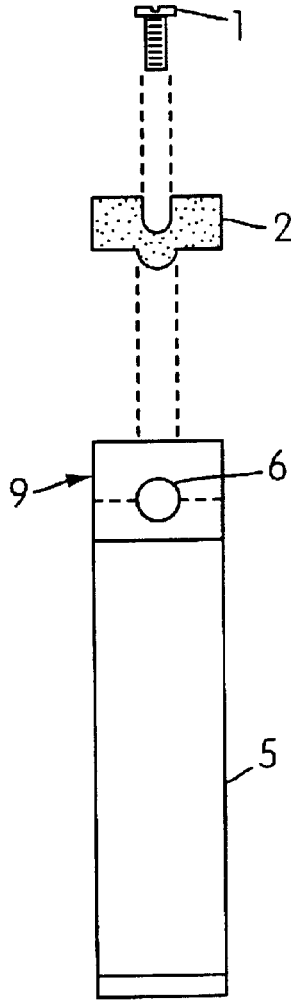
FIG. 7 shows an exploded view of components of the pin, viewed from the front.
Figure 9:
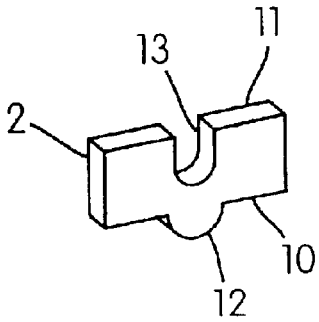
FIG. 9 shows a perspective view of a pressure transfer element embodying the invention.

The pressure transfer element 2 includes a generally rectangular pad or plate shown particularly in FIGS. 7 and 9, which is positioned in a rectangular trough shaped cavity 9 in the upper end of the pin 5. The pressure transfer element 2 is mounted in the cavity 9 in such a manner as to allow movement of the pressure transfer element 2 towards the channel 6 but to prevent rotary movement of the transfer element 2 relative to the channel 6. The cavity 9 is formed as an open trough on the top of the terminal body extending transverse to the direction of the channel 6.

Referring to FIG. 9, the transfer element 2 has one side 10 for contacting the cable in the channel 6 and an opposite side 11 for contacting the screw 1. The first side 10 has a protruding portion 12 in the shape of a cam element for contacting the cable 3 in the channel 6, and the opposite side 11 has a U-shaped valley 13 therein into which the screw 1 protrudes.

Figure 8:
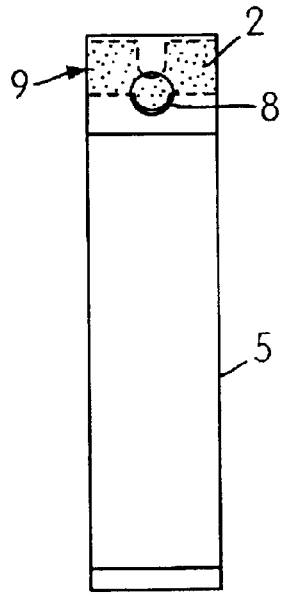
FIG. 8 shows a front view of the pin during assembly of components of the pin.

Referring particularly to FIGS. 7 and 8, the radius of the semi-circular protruding portion 12 is smaller than the radius of the channel 6, and the relationship between the cavity 9 and the pressure element 2 is such that there is provided a space 8 between the pressure element 2 and the bottom of the channel 6, which accommodates the cable 3.

Figure 5:
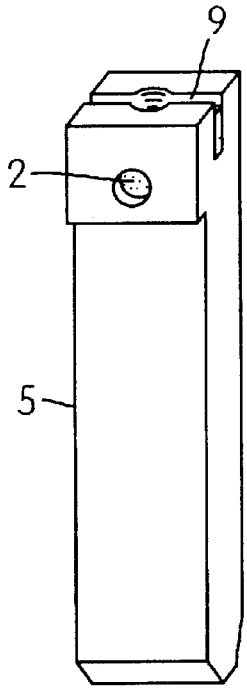
FIGS. 5 and 6 show respectively a perspective view and side view of the pin during assembly of components in the pin.
Figure 4:
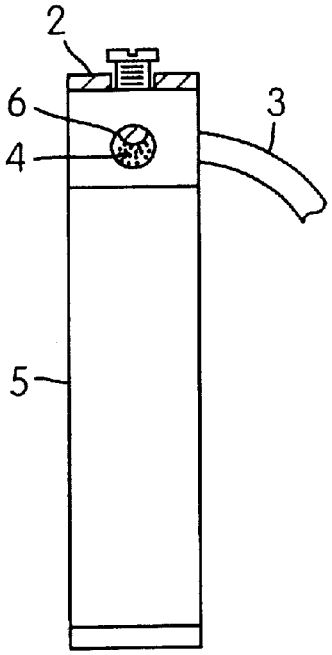
FIG. 4 shows a front view of the pin, during assembly with a cable.
Figure 6:
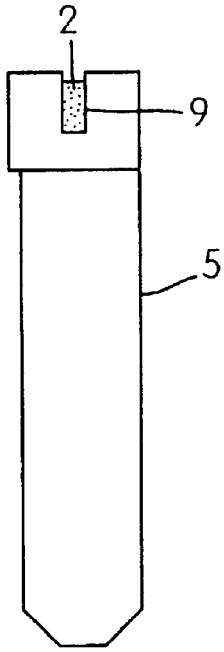

FIG. 4 shows the cable 3 being placed in the circular channel 6 where the strands of wire of the cable 3 are indicated at 4. FIG. 5 shows the perspective view of FIG. 1 with the screw 1 removed. FIG. 6 shows a side view of FIG. 5. FIG. 7 shows the screw 1 and pressure transfer element 2 removed from the pin 5. In use the tip of the screw 1 will apply pressure to the most bottom part of the U-shaped valley 13 of the pressure transfer element 2 during operation. FIG. 8 shows the pressure transfer element 2 being placed in the pin 5. FIG. 9 shows a perspective view of the pressure transfer element 2. The pressure transfer element 2 is made up basically as a rectangular piece with the U-shaped valley in the center and the semi-circular cam element 12 at its bottom. The diameter of the cam element 12 is slightly smaller than the diameter of the circular channel 6 as shown in FIGS. 7 and 8.

Figure 3:
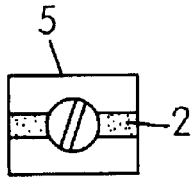

FIG. 3 shows clearly that the width of the pressure element 2 (in the direction of the channel 6) is much less than the diameter of the threaded hole for the screw 1, so that when the cavity 9 is cut out of the pin terminal 5, the screw threads are not removed totally, as shown in FIG. 5. Otherwise the screw 1 could never be tightened. The same design can be applied for the earth and line pins of the electric plug.

Figure 10:
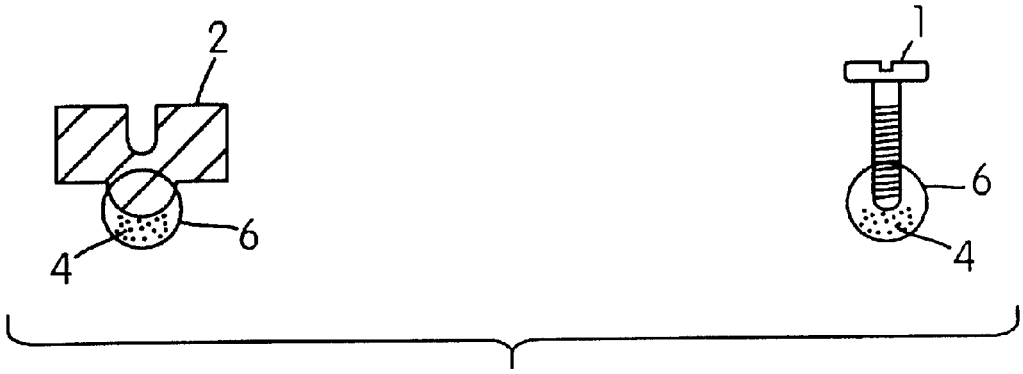
FIGS. 10. 11 and 12 show various effects of securing a cable in the pin shown earlier, both with and without a pressure transfer element embodying the invention.
Figure 11:
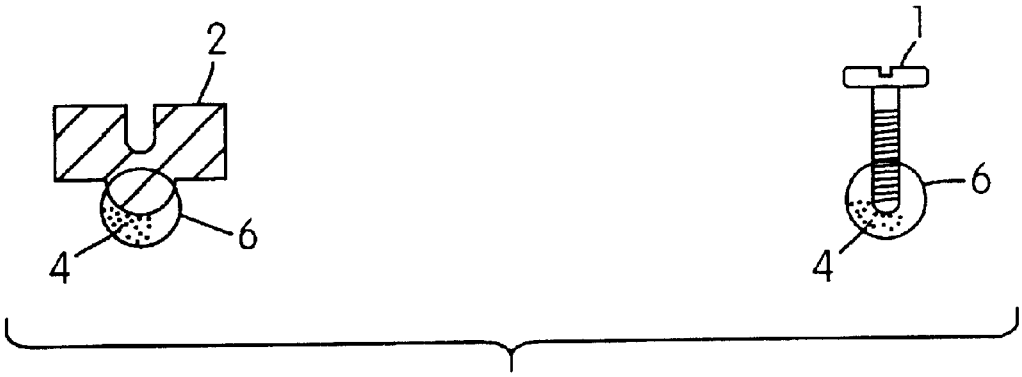
Figure 12:
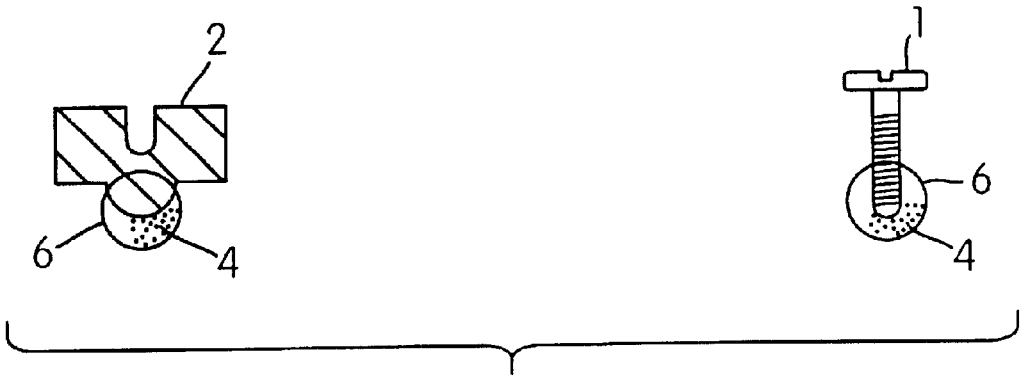

FIG. 10 shows a comparison of the quality of contact for the pin terminal, both when incorporated with the pressure transfer element 2 and without the pressure transfer element 2. On the left hand side of FIG. 10, the bottom of the cam element 12 has a bigger area of contact for wire strands 4 of the cable compared to the tip of the screw 1 which although slightly convex has an area for contact which is still small when the cable 3 is placed in the center of circle 6. FIG. 11 shows the cable 3 being placed in such a way that the strands of wire are skewed to the left. The cam element 12 is again in contact with most of the strands as compared with the tip of the screw 1, as some of the wire strands 4 are not under pressure. FIG. 12 shows the wire strands 4 skewed to the right and the same reasoning applies as for FIG. 11.

FIG. 8 shows, in broken lines, the position of the pressure transfer element 2 when the screw 1 is tightened to its maximum extent, for example in the absence of a cable. In this position, the bottom flat surface 10 (FIG. 9) of the pressure transfer element 2 rests against the bottom of the trough-shaped cavity 9, and is stopped from moving any lower. In this position, a half annular space 8 is left between the semi-circular protruding portion 12, and the bottom of the circular cross-section channel 6.

What is claimed is:

1. A terminal for an electrical connector, the terminal comprising:

a terminal body, a screw and a pressure transfer element;

wherein the terminal body defines a conductor opening therein for receiving an electrical conductor, a screw opening extending into the terminal body to the conductor opening and an open trough-shaped cavity transverse to the conductor opening, the trough-shaped cavity extending right through a portion of the terminal body from one side thereof to an opposite side thereof via the screw opening;

wherein the screw is threaded into the screw opening of the terminal body for securing the electrical conductor in the opening by applying pressure to the electrical conductor by rotation of the screw, and wherein the pressure transfer element is a generally flat pressure transfer element positioned in the trough-shaped cavity between the screw and the conductor opening, the pressure transfer element being movable in the cavity towards the conductor opening for applying pressure from the screw to an electrical conductor in the conductor opening to secure the electrical conductor in the opening.

2. A terminal according to claim 1 in which the pressure transfer element has a first side for contacting an electrical conductor in the said conductor opening in the terminal body, and an opposite side for contacting the screw, the first side having a protruding portion for contacting the electrical conductor in the conductor opening, and the opposite side having a U-shaped valley therein into which the screw protrudes.

3. A terminal according to claim 1 in which the conductor opening comprises a channel of circular cross-section, and the pressure transfer element has a convex curved surface on its side remote from the screw, positioned opposite an interior surface of the channel, for securing an electrical conductor in the channel by gripping the electrical conductor between the curved surface of the pressure transfer element and the interior surface of the channel.

4. A terminal according to claim 3 in which the convex curved surface has a part circular cross-section of radius less than the radius of the cross-section of the channel.

5. A terminal according to claim 1 in which the pressure transfer element is mounted in such a manner as to allow movement of the pressure transfer element towards the said conductor opening but to prevent rotary movement of the pressure transfer element relative to the conductor opening.

6. A terminal according to claim 1 in which the contact area of the pressure transfer element available in use for contacting an electrical conductor in the conductor opening is greater than the contact area of the screw without the pressure transfer element.

7. A terminal according to claim 2 in which the conductor opening comprises a channel of circular cross-section, and the pressure transfer element has a convex curved surface on its side remote from the screw, positioned opposite an interior surface of the channel, for securing an electrical conductor in the channel by gripping the electrical conductor between the curved surface of the pressure transfer element and the interior surface of the channel.

8. A terminal according to claim 7 in which the convex curved surface has a part circular cross-section of radius less than the radius of the cross-section of the channel.

9. A terminal according to claim 8 in which the pressure transfer element is mounted in such a manner as to allow movement of the pressure transfer element towards the conductor opening but to prevent rotary movement of the pressure transfer element relative to the conductor opening.

10. A terminal according to claim 9 in which the contact area of the pressure transfer element available in use for contacting an electrical conductor in the conductor opening is greater than the contact area of the screw without the pressure transfer element.

11. An electrical plug including at least one terminal according to claim 10, in which the terminal comprises a pin protruding from the plug at one end of the pin, the pin having the said conductor opening at the other end of the pin.

12. A terminal according to claim 1 in which the contact area of the pressure transfer element available in use for contacting an electrical conductor in the conductor opening is greater than the contact area of the screw without the pressure transfer element.

13. An electrical plug including at least one terminal according to claim 1.

14. An electrical plug according to claim 13, in which the terminal comprises a pin protruding from the plug at one end of the pin, the pin having the conductor opening for an electrical conductor at the other end of the pin.

* * * * *